United States Patent [19]

Hennells

[11] 4,057,236
[45] Nov. 8, 1977

[54] ENERGY ABSORBER

[76] Inventor: Ransom J. Hennells, 45500 N. Territorial Road, Plymouth, Mich. 48170

[21] Appl. No.: 686,585

[22] Filed: May 14, 1976

Related U.S. Application Data

[63] Continuation-in-part of Ser. No. 608,885, Aug. 29, 1975.

[51] Int. Cl.² ............................................. F16F 9/48
[52] U.S. Cl. ................................ 267/116; 267/65 R; 188/287; 188/315
[58] Field of Search ................... 267/65 R, 116, 64 R; 188/315, 322, 298, 287; 213/43

[56] References Cited
U.S. PATENT DOCUMENTS

| 2,095,748 | 10/1937 | Johnson | 267/64 R |
|---|---|---|---|
| 3,344,894 | 10/1967 | Kenworthy | 188/287 |
| 3,693,767 | 9/1972 | Johnson | 188/287 |
| 3,750,856 | 8/1973 | Kenworthy | 188/287 |

Primary Examiner—James B. Marbert
Attorney, Agent, or Firm—Blanchard, Flynn, Thiel, Boutell & Tanis

[57] ABSTRACT

An adjustable energy absorber including a housing having a ram slidably extending therefrom. A first control sleeve divides the housing into a pair of fluid chambers, which sleeve has an axially extending row of openings to provide communication between the two chambers. A second control sleeve surrounds the first sleeve and is nonrotatably connected thereto. The first and second sleeves have compatible outer and inner conical surfaces, respectively. The first and second sleeves are axially adjustable with respect to one another to form a narrow flow passage between the opposed conical surfaces. Imposition of a force on the ram causes fluid to be forced from one chamber through the openings into the flow passage, and then into the other chamber. By varying the width of the flow passage, as by axially moving one control sleeve relative to the other, the amount of energy absorbed by the fluid during the movement of the ram can be selectably adjusted.

10 Claims, 6 Drawing Figures

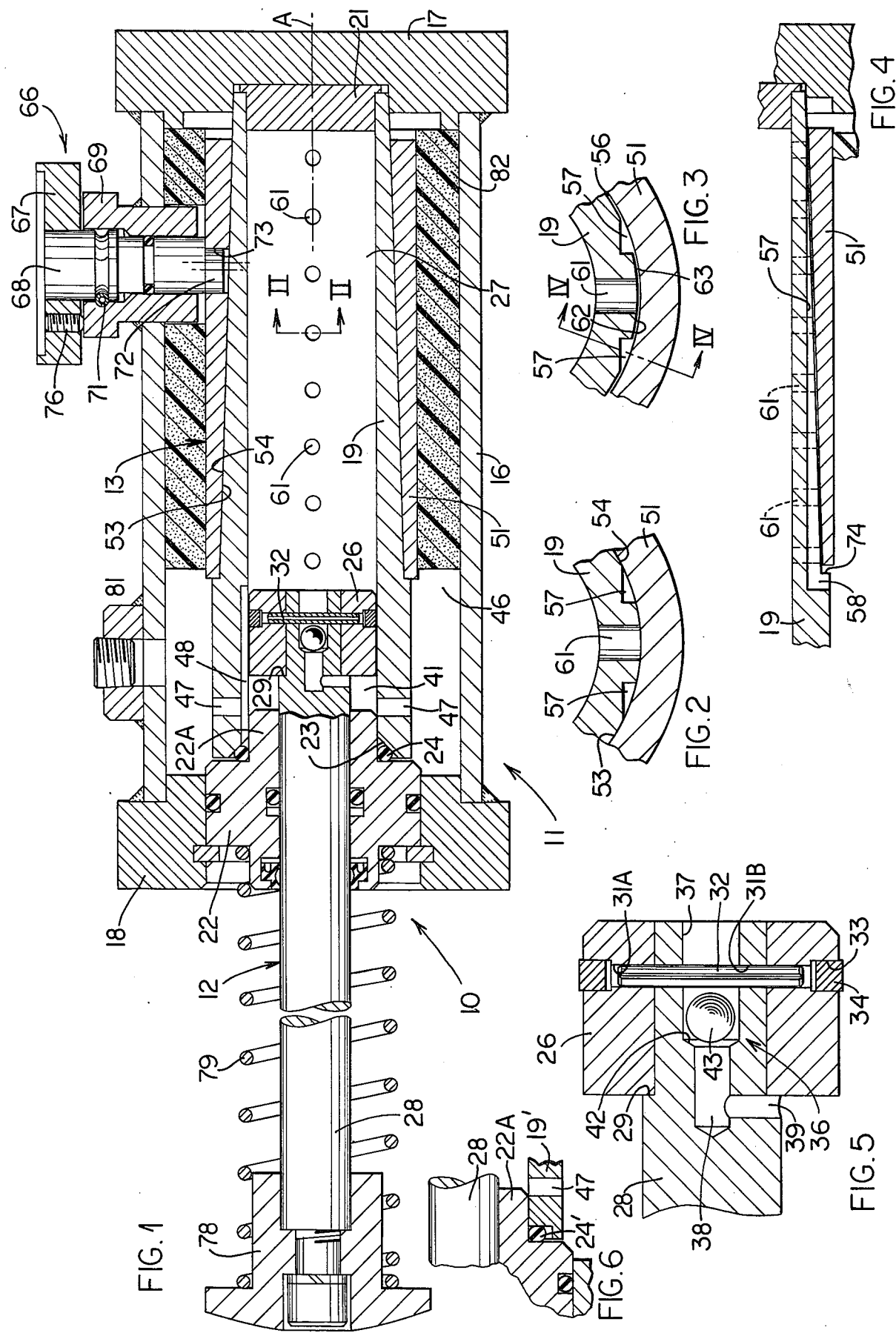

ENERGY ABSORBER

CROSS-REFERENCE TO RELATED APPLICATION

This application is a continuation-in-part of copending application Ser. No. 608,885, filed Aug. 29, 1975.

FIELD OF THE INVENTION

This invention relates generally to energy absorbers and, in particular, to an adjustable hydraulic shock absorber which is capable of being adjusted to absorb shock loads of varying amounts.

BACKGROUND OF THE INVENTION

Energy absorbers have often been customized or built in accordance with the requirements of the particular load conditions under which they were to perform. This is highly undesirable since building a shock absorber for each type of job is costly and time consuming. Further, customized shock absorbers are necessarily of many different sizes and there is generally no standardization among the individual components thereof, thereby making maintenance expensive and difficult.

To overcome the above disadvantage, several energy absorbers have been commercially manufactured which permit the energy absorbing capability thereof to be adjusted in accordance with the expected load conditions, thereby permitting the shock absorber to be utilized in many different loading and environmental conditions. While many of these adjustable energy absorbers have been adaptable to a wide range of load conditions, nevertheless these energy absorbers have not been as widely utilized as the area of need for same might indicate since they have been relatively costly. Specifically, most known adjustable energy absorbers have utilized a complex adjustment structure which is both expensive to manufacture and difficult to use. More specifically, these known shock absorbers have required an excessive amount of precise, and hence costly machining.

Also, many of the known adjustable shock absorbers use concentric, inner and outer control sleeves which are relatively movable for controlling flow between two chambers. However, these sleeves must be machined with extremely precise tolerances and/or machined as a matched pair in order to permit proper fit and opertion. This thus prevents random assembly of the parts, and hence substantially increases the cost of assembly.

Copending Application Ser. No. 608,885, filed Aug. 29, 1975, discloses therein an improved energy absorber, particularly a hydraulic shock absorber, which overcomes the abovementioned disadvantages. The shock absorber disclosed in this copending application, and particularly the embodiment illustrated in FIGS. 5–8, has proven to operate in a highly desirable and successful manner with respect to its energy absorbing capability and the adjustability thereof. However, in a continuing effort to improve upon this shock absorber, additional modifications have been made therein which are believed to improve the structural and operational characteristics thereof.

Thus, it is an object of this invention to provide an improved energy absorber which possesses the operational and structural characteristics of the energy absorber disclosed in the above-mentioned application, and which incorporates further improvements therein. For example, the energy absorber of this invention incorporates an improved adjustment structure to facilitate a simple yet precise adjustment between the control sleeves to vary the energy absorbing characteristic. Another improvement relates to the piston structure and particularly the manner in which pressure fluid is permitted to flow from behind the piston to permit a more rapid return thereof when the shock force is relieved. Still further improvements relate to the structure of the shock absorber so as to simplify the manufacture and assembly thereof, thereby minimizing the manufacturing cost, while at the same time maintaining the desirable operating characteristics.

Other objects and purposes of this invention will be apparent to persons familiar with structures of this type upon reading the following specification and inspecting the accompanying drawings.

BRIEF DESCRIPTION OF THE DRAWINGS

FIG. 1 is a central sectional view of an adjustable energy absorber according to this invention.

FIG. 2 is a fragmentary sectional view along line II—II in FIG. 1.

FIG. 3 is a view similar to FIG. 2 but showing the control sleeves in a spaced or open condition.

FIG. 4 is a fragmentary sectional view taken along line IV—IV in FIG. 3.

FIG. 5 is an enlarged, fragmentary, central sectional view of the piston end of the ram.

FIG. 6 is an enlarged, fragmentary sectional view of a modified structure.

In the following description, certain terms will be used for convenience in reference only and will not be limiting. For example, the words "upwardly", "downwardly", "rightwardly" and "leftwardly" will designate directions in the drawings to which reference is made. The words "inwardly" and "outwardly" will refer to contraction and extension, respectively, of the reciprocating ram, which contraction and extension occurs when the ram moves rightwardly and leftwardly as appearing in FIG. 1. The words "inwardly" and "outwardly" will also refer to directions toward and away from, respectively, the geometric center of the energy absorber and designated parts thereof. Said terminology will include the words above mentioned, derivatives thereof and words of similar import.

DETAILED DESCRIPTION

FIG. 1 illustrates an energy absorber 10, specifically a hydraulic shock absorber, which includes a housing 11 having a ram assembly 12 slidably positioned in and extending therefrom. A flow control sleeve assembly 13 is positioned within the housing for controlling relative movement between the ram assembly 12 and the housing 11 due to imposition of an external load on the shock absorber. The flow control sleeve assembly 13 is adjustable, as explained hereinafter, to permit the quantity of energy absorbed to be selectively varied.

The housing 11 includes a hollow cylindrical sleeve 16 fixedly connected between a pair of end members 17 and 18.

The flow control sleeve assembly 13 includes an inner cylindrical control sleeve 19 positioned within the housing and extending substantially the full axial length thereof. The sleeve 19 is fixed with respect to the housing and has the rightward end thereof pressed onto a member 21 which abuts against the end member 17. The leftward end of sleeve 19 is snugly seated on an annular projection 22A which extends inwardly from a bearing sleeve 22 which is fixedly and sealingly mounted on the other end member 18. A conical wall 23 is formed on the inner edge of the leftward end of sleeve 19, and a conventional elastomeric O-ring 24 is clampingly engaged between the wall 23 and the corner defined on the end member 18 to create a sealed relationship therebetween. This structure overcomes any problem caused during the assembly of the shock absorber due to the accumulation of axial tolerances on the individual parts, whereby the individual parts can be manufactured with less stringent tolerances and at the same time permit a more efficient assembly of the shock absorber.

As an alternative, the leftward end of sleeve 19 can have an annular recess 23' formed therein, as shown in FIG. 6, so as to accommodate the O-ring 24'.

The ram assembly 12 has a substantially cylindrical piston 26 on the inner end thereof, which piston is disposed within a chamber 27 defined within the inner control sleeve 19 and is slidably guided for axial movement therealong. The piston 26 is fixedly secured on the inner end of a piston rod 28. The piston rod has a reduced diameter portion for accommodating the piston thereon, which piston abuts against a shoulder 29 formed on the rod 28. The piston 26 and piston rod 28 have aligned holes 31A and 31B (FIG. 5) extending diametrically thereacross, which holes receive therein an elongated axially split spring pin 32. The pin 32 expands circumferentially to be snugly accommodated within the holes 31A–31B so as to fixedly interconnect the piston and the piston rod.

The piston 26 has an annular groove 33 extending therearound, which groove communicates with the holes 31. A conventional annular split piston ring 34 may, if necessary, be disposed in the groove 33 to create a slidable sealed engagement with the inner wall of the sleeve 19. Piston ring 34 also retains the spring pin 32 within the holes 31.

A one-way check valve assembly 36 is associated with the inner end of the ram assembly, particularly the piston 26. This check valve assembly 36, as shown in FIGS. 1 and 5, includes a first passage formed as a large diameter bore 37 extending coaxially inwardly from the inner free end of the piston rod 28. This bore 37 in turn communicates with and is coaxially aligned with a further passage formed as a small diameter bore 38. A further passage 39 extends radially of the piston rod adjacent the rear face of the piston and communicates with the bore 38 adjacent the axially inner end thereof. The radially outer end of transverse passage 39 communicates with a chamber 41 which is formed within the sleeve 19 and is located between the opposed axial faces of the piston 26 and the end hub 22A when the piston 26 is moved slightly inwardly away from the end hub as shown in FIG. 1.

To control flow through the passage arrangement defined by the passages 37, 38 and 39, there is provided a movable valve member in the form of a ball 43 which is adapted to seat against an annular conical valve seat 42 formed at the junction between the bores 37 and 38. The ball 43 is disposed in the large bore 37 and is of a larger diameter than the bore 38. The ball 43 is confined in the bore 37 by the locking pin 32 which extends diametrically across the bore 37 but is spaced axially a small distance from the ball 43 to permit movement of the ball away from the seat 42 so as to permit flow through the passage arrangement.

The inner control sleeve 19 has small holes 47 formed through the wall thereof and communicating at the radially outer ends with an outer annular chamber 46 formed between the sleeve assembly 13 and the outer housing sleeve 16. The holes 47 are disposed adjacent the leftward end of the sleeve 19, which end has the piston 26 associated therewith when the shock absorber is in its extended position. The holes 47 are positioned directly adjacent the inner axial face of the hub 22A so that the holes thus communicate with the chamber 41 at all times. One of the holes 47 has the radially inner end thereof joined in flow communication with an axially extending groove 48 formed in the inner wall of the sleeve 19, which groove 48 terminates at a location which is disposed slightly forwardly of the front face of the piston 26 when the ram assembly is in its fully extended position. The operation of the holes 47, and the groove 48, will be explained hereinafter.

The flow control sleeve assembly 13 also includes an outer cylindrical control sleeve 51 disposed concentric with and in surrounding relationship to the inner control sleeve 19. The outer sleeve 51 has the rightward end thereof axially spaced from the end member 17, whereby outer sleeve 51 can thus be moved axially through a limited extent relative to the inner sleeve 19.

The control sleeves 19 and 51 have opposed conical surfaces formed thereon for permitting adjustment in the energy absorption characteristic of the shock absorber. For this purpose, the outer control sleeve 51 has an inner conical surface 53 which is disposed opposite and is adapted to be engaged with an outer conical surface 54 as formed on the inner control sleeve 19. The conical surfaces 53 and 54 are of an identical taper, which taper preferably extends at a small angle relative to the longitudinally extending axis A of the shock absorber. In the illustrated embodiment, the taper of the conical surfaces is normally in the range of between 1° and 5°, and preferably 2°, although the present invention also contemplates the use of a larger angle of taper. The conical surfaces 53 and 54 are maintained substantially in engagement with one another when the sleeve assembly 13 is in its fully closed position, in which position the outer sleeve 51 is in its leftward most position.

To provide for controlled flow of fluid from the inner chamber 27 through the sleeve assembly 13 to the outer chamber 46, which controlled flow permits the absorption of energy when a shock load is imposed on the absorber, the inner and outer control sleeves are relatively moved into a position in which the opposed conical surfaces 53 and 54 are spaced a small distance apart so as to result in the formation of a small annular space 56 therebetween. The inner control sleeve 19 is provided with a pair of elongated slots 57 (FIGS. 2–4) formed in the outer conical surface 54 thereof, which slots 57 extend axially of the sleeve 19 throughout substantially the complete length of the outer sleeve 51. The slots 57 terminate, at the leftward ends thereof, in openings 58 (FIG. 4) which communicate with the outer chamber 46. The slots 57 are disposed closely adjacent and on opposite sides of an axially extending row of openings 61 which are formed in the inner sleeve 19 and communicate with the inner chamber 27. The slots 57 and their relationship to the row of openings 61 results in the formation of narrow circumferentially extending lands 62 between the row of openings 61 and the adjacent slots 57. The lands 62 are adapted to be spaced from the opposed inner conical surface 53 and thus define narrow flow control passages 63 therebetween for controlling the fluid flow from the openings 61 into the slots 57.

The slots 57 are preferably formed in the sleeve 19, as by a milling cutter, such that the bottom wall of each slot extends substantially parallel to the axis A. This results in the cross-sectional area of each slot 57 progressively increasing as the slot extends from the inner or rightward end thereof to the outer or leftward end thereof, as illustrated in FIG. 4. The slot 57 thus is effectively of zero cross-sectional area adjacent the rightward end of the sleeve 51, whereas the slot progressively increases in area and has a maximum cross-sectional area adjacent the leftward end of the control sleeve 51.

While FIGS. 2 and 3 illustrate the use of two slots 57 positioned closely adjacent but on opposite sides of the row of openings 61, it will be appreciated that the shock absorber can be provided with only a single slot 57 if desired.

The outer control sleeve 51 is axially adjustable relative to the inner control sleeve 19 so as to vary the radial width or dimension of the passages 56 and 63. For this purpose, there is provided an adjustment structure 66 which includes a knob or handle 67 fixedly secured to the outer end of a control shaft 68, which control shaft is in turn rotatably and sealingly supported on a housing hub 69 so that the control shaft is rotatable about an axis which extends substantially perpendicular to the axis A. Control shaft 68 is axially restrained with respect to the housing hub 69 by means of a locking pin 71. Control shaft 68 has a cam or eccentric 72 fixedly secured to the inner end thereof, which eccentric is disposed within an opening or slot 73 formed in the outer control sleeve 51. The eccentric 72 is preferably of circular cross-section and has the axis thereof eccentrically displaced from the axis of the shaft 68, whereby eccentric 72 functions like a crankpin. The slot 73 has a width, as measured in the axial direction of the control sleeve 51, which substantially corresponds to the diameter of the eccentric 72 so that same is snugly accommodated in the slot. However, slot 73 has a length, as measured circumferentially of the control sleeve, which is preferably greater than the diameter of the eccentric to thereby compensate for the sideward displacement of the eccentric during rotation of the control shaft 68.

The control shaft 68 is rotatable through an angle of approximately 180°, and preferably slightly less, so as to cause a corresponding rotation of the eccentric 72, which in turn causes axial displacement of outer control sleeve 51 between two endmost positions. When the adjustment structure is in the position illustrated in FIG. 1, in which position the eccentric 72 is in its leftward end position, the outer control sleeve 51 effectively abuts against a stop 74 (FIG. 4) as formed on the inner control sleeve 19, thereby resulting in a minimum clearance between the conical surfaces 53 and 54 so that the openings 61 are effectively closed. The presence of the stop 74, however, prevents the two conical surfaces 53 and 54 from being lockingly wedged together.

When the control knob 67 and eccentric 72 are rotated away from the position illustrated in FIG. 1, then the outer control sleeve 51 is moved axially rightwardly so that the spacing 56 between the conical surfaces 53 and 54 is increased, with the maximum spacing existing when the sleeve 51 is in its rightward position. Rotation of knob 67 thus permits the spacing between the conical surfaces to be selectively varied and adjusted to provide for the desired restricted flow of fluid from the inner chamber 27 into the outer chamber 46 when the ram assembly 12 is moved inwardly into the housing 11.

The shock absorber can be suitably locked in its selected position by means of a set screw 76 which locks the knob 67 to the housing hub 69 and thereby fixedly maintains the positional relationship between the control sleeves 19 and 51. Set screw 76 is positioned substantially parallel to the axis of the control shaft 68 and thus projects perpendicularly from the side of the housing so as to be readily accessible for adjustment, as by means of an Allen wrench or other tool.

The ram assembly 12 has an enlarged head 78 on the outer free end of the piston rod 28, which head 78 is adapted to have the shock loads imposed thereon, and a conventional compression spring 79 surrounds the piston rod 28 and is confined between the head 78 and the bushing 22 to thereby continuously urge the ram assembly into its outward extended position.

Housing 11 has a port 81 associated therewith to permit the shock absorber to be filled with fluid, such as hydraulic oil. This port is normally closed by means of a conventional plug. Chamber 46 also preferably has a compressible sponge-like member 82 positioned therein so as to compensate for volume changes caused by the inward movement of the piston rod, which member 82 substantially encircles the sleeve 51 throughout the axial extent thereof. The member 82 is preferably of a rubber or plastic closed-cell structure.

OPERATION

In an operational position, energy absorber 10 is normally maintained with its ram assembly 12 in an extended position as illustrated in FIG. 1 due to the urging of spring 79. The absorber is filled with fluid so that same completely fills at least the chamber 27, and preferably also the chamber 46.

When an external load or shock force is imposed on the ram assembly 12, this causes piston rod 28 and piston 26 to move inwardly (rightwardly in FIG. 1). During this inward movement, check valve assembly 36 is maintained closed. Inward movement of piston 26 causes fluid in chamber 27 to be forced outwardly through the holes 61 and across the flow control passages 63 into the slots 57, from which the fluid flows axially along the slots 57 into the outer chamber 46. Some of the fluid in outer chamber 46 in turn flows through the holes 47 into the chamber 41 which is formed behind the piston.

As the piston 26 moves axially toward the rightward end of the housing, it sequentially closes off the openings 61, which in turn progressively restricts the further flow of fluid from chamber 27 into chamber 46. This causes the piston 46 to progressively decelerate so that as the piston approaches the inner end of the chamber 27 (rightward end in FIG. 1), the external shock load imposed on the shock absorber will be substantially dissipated. The ram is thus very uniformly decelerated and hence stopped.

Since the slots 57 are of progressively increasing cross-sectional area, from the rightward to the leftward ends thereof, they readily accommodate the variable flow therethrough depending upon the number of openings 61 which are uncovered. For example, when the piston 26 is adjacent the leftward end of the absorber, a large number of openings 61 are uncovered so that fluid flows through the openings 61 into the slots 57 along substantially the complete length thereof. This larger quantity of fluid is permitted to flow along alots 57 since the cross-sectional area of these slots progressively increases toward the discharge end of the slots in correspondence with the progressive spacing of the openings axially along the inner control sleeve.

As the piston moves inwardly into the chamber 27, causing fluid to flow from chamber 27 into chamber 46, this causes a compression of sponge member 82 in order to compensate for the volume of the piston rod.

When the inward movement of the ram assembly has been stopped and the external load removed therefrom, the ram assembly is returned to its extended position due to the urging of spring 79 and due to the expansion of sponge member 82. During this return movement of the ram assembly, the fluid in chamber 41 causes the check valve assembly 36 to open so that fluid flows through the passages 36, 37 and 38 into the chamber 26.

When the ram approaches its fully extended position so that the piston is in the position illustrated in FIG. 1, the forward end of groove 48 is now disposed in front of the piston and accordingly permits direct communication with the chamber 27 so that fluid can now flow from the outer chamber 46 through hole 47 and groove 48 into the inner chamber 27. When in this position, the axially extending groove 48 also provides direct communication between the chambers 27 and 41 to further facilitate the flow of fluid into chamber 27, whereupon the piston 26 can thus be fully retracted by the spring 79 into a position wherein it substantially abuts against the end hub 22A.

To adjust the deceleration rate of the ram assembly 12, and thereby vary the energy dissipating characteristic of the shock absorber, the position of the outer control sleeve 51 can be adjusted by means of the adjustment structure 66 to permit a fine and precise adjustment in the spacing between the conical surfaces on the control sleeves.

While the structural and operational features of the present invention have been described with reference to a shock absorber employing a cooperating pair of sleeves having opposed conical surfaces thereon, and while use of these features on a shock absorber of this type is highly advantageous, nevertheless it will be appreciated that these structural and operational features can also be advantageously employed in many conventional shock absorbers.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. In a fluid-type energy absorber, comprising:
   housing means including a central tubular housing member and a pair of end members positioned adjacent opposite ends of said central tubular housing member;
   sleeve means disposed in said housing means for forming a first fluid chamber within the interior of said sleeve means and a second fluid chamber between said sleeve means and said tubular housing member;
   ram means slidably disposed on said housing means for receiving a shock load thereon, said ram means including a piston slidably disposed within one of said fluid chambers and piston rod means connected to said piston and extending outwardly from said housing means;
   opening means associated with said sleeve means for permitting controlled flow of fluid from said one chamber into the other chamber to decelerate the ram means when the piston is moved axially of said one chamber in a first direction away from an initial impact position wherein it is disposed adjacent one end of said housing means;
   a third fluid chamber formed at said one of said housing means directly behind said piston when same is moving in said first direction, said third chamber being in continuous communication with said other chamber;
   one-way check valve means associated with said piston for permitting fluid flow therethrough from said third chamber into said one chamber when said piston is moving axially of said one chamber in a second direction which is opposite said first direction, said one-way check valve means preventing flow of fluid from said one chamber directly into said third chamber when said piston is moving in said first direction;
   said one-way check valve means including first passage means formed in said ram means for providing communication between said third chamber and said one chamber, and a movable check valve member associated with said first passage means; and
   second passage means for providing direct and continuous communication between said third chamber and said one chamber only when said piston is disposed in a position closely adjacent said one end of said housing means to premit the flow of additional fluid into said one chamber as said piston is moving in said second direction, whereby said piston can be rapidly returned to said initial position, said second passage means being independent of said one-way check valve means.

2. An energy absorber according to claim 1, wherein said second passage means comprises a passageway formed in and extending axially of said sleeve means, said passageway being of sufficient axial length so that the opposite axial ends thereof communicate with said one and third chambers when said piston is adjacent said one end of said housing means, said piston when moved away from saod one end isolating said passageway from said one chamber.

3. An energy absorber according to claim 2, wherein said piston is slidably disposed within the interior of said sleeve means, said sleeve means including first and second sleeve members disposed in concentric relationship with one another and having opposed conical surfaces formed thereon and disposed closely adjacent one another, the first sleeve member being disposed innermost and having the piston slidably disposed therein, the first sleeve member being fixedly mounted with respect to said housing means and extending axially between said pair of end members, said opening means extending through the wall of said first sleeve member, and said second sleeve member being disposed in surrounding relationship to said first sleeve member and being movable axially relative thereto for controlling the flow of fluid through said opening means.

4. In combination, a fluid-type energy absorber having a housing and a ram assembly slidably supported on the housing and projecting outwardly therefrom, the ram assembly including a piston rod having a piston mounted thereon and slidably disposed within the housing, comprising the improvement wherein the piston is of annular configuration and surrounds and is fixedly connected to an end of the piston rod by an elongated pinlike locking member which extends diametrically across and interconnects the piston and the end of the piston rod, said rod end and said piston having aligned openings extending diametrically therethrough and accommodating said locking member therein, and one-way valve means associated with and extending axially through said piston for permitting flow from one side to the other side of said piston in response to axial movement thereof in one direction, said rod end having an opening formed therein and extending axially of the rod through a distance greater than the axial length of said piston, said opening having a check valve member movably positioned therein, and said locking member extending across said opening for confining said pinlike valve member therein.

5. A combination according to claim 4, wherein said locking member comprises an axially split spring pin.

6. A combination according to claim 4, wherein said piston also has an annular groove formed around the outer circumferential periphery thereof, the bottom of said groove communicating with the diametrical opening in said piston, and a split piston ring disposed within said annular groove and surrounding said piston, said piston ring being disposed in sliding sealed engagement with said housing.

7. A combination according to claim 6, wherein the housing includes a pair of spaced end members fixedly joined together by an outer tubular member, said housing also including an inner tubular member which extends between the end members and is spaced radially inwardly from the outer tubular member so as to define a fluid receiving chamber therebetween, said inner tubular member having opening means extending therethrough for providing communication between the interior of said inner tubular member and the chamber defined between said inner and outer tubular members, and said piston being slidably disposed within the interior of said inner tubular member.

8. In a fluid-type energy absorber, including:
  housing means including a tubular housing member and first and second end members fixedly positioned adjacent the opposite ends of said tubular housing member;
  a sleeve member disposed in said housing means for forming a first fluid chamber within the interior of said sleeve member and a second fluid chamber between said sleeve member and said tubular housing member, said sleeve member having opening means extending radially therethrough to permit fluid communication between said first and second chambers;
  said sleeve member being fixed with respect to said housing means and having one end thereof disposed in abutting engagement with said first end member, said sleeve member having the other end thereof fixedly mounted on an annular portion associated with said second end member;
  ram means slidably disposed on said housing means for receiving a shock load thereon, said ram means including a piston slidably disposed within one of said fluid chambers and piston rod means connected to said piston and extending outwardly from an end of said housing means; and
  means for controlling the energy dissipation characteristics of said energy absorber, said controlling means including a control member disposed substantially adjacent said sleeve member and overlapping said opening means for controlling the flow therethrough;
  comprising the improvement wherein the other end of said sleeve member is normally spaced a small distance from an end face formed on said second end member, said other end having an edge surface spaced from said end face, and an elastomeric seal ring compressed between and sealingly engaged with said end face and said edge surface.

9. An energy absorber according to claim 8, wherein said edge surface is conical.

10. An energy absorber according to claim 8, wherein the other end of said sleeve member has a conical recess formed therein, said conical recess extending inwardly from said other end and communicating with the interior of said sleeve member, the conical recess being defined by a conical wall which comprises said edge surface, said elastomeric seal ring being disposed within said conical recess and compressed between and sealingly engaged with not only the end face and said conical edge surface, but also with the outer peripheral surface of the annular portion associated with said second end member.

* * * * *

UNITED STATES PATENT AND TRADEMARK OFFICE
CERTIFICATE OF CORRECTION

PATENT NO. : 4 057 236
DATED : November 8, 1977
INVENTOR(S) : Ransom J. Hennells It is certified that error appears in the above-identified patent and that said Letters Patent are hereby corrected as shown below:

Column 8, line 8; after "one" insert ---end---.

Column 8, line 31; change "premit" to ---permit---.

Column 8, line 44; change "saod" to ---said---.

Column 9, line 14; after "said" insert ---pinlike---.

Column 9, line 15; after "said" (second occurrence) delete "pinlike".

Signed and Sealed this

Twenty-first Day of February 1978

[SEAL]

Attest:

RUTH C. MASON
Attesting Officer

LUTRELLE F. PARKER
Acting Commissioner of Patents and Trademarks